United States Patent
Snyder et al.

(10) Patent No.: US 11,741,203 B1
(45) Date of Patent: Aug. 29, 2023

(54) MOBILE IDENTITY INFORMATION CONTROLLED DEVICE

(71) Applicant: Alclear, LLC, New York, NY (US)

(72) Inventors: Matthew Snyder, New York, NY (US); Joe Trelin, Seattle, WA (US)

(73) Assignee: ALCLEAR, LLC, New York, NY (US)

( * ) Notice: Subject to any disclaimer, the term of this patent is extended or adjusted under 35 U.S.C. 154(b) by 144 days.

(21) Appl. No.: 16/802,794

(22) Filed: Feb. 27, 2020

Related U.S. Application Data

(60) Provisional application No. 62/812,345, filed on Mar. 1, 2019.

(51) Int. Cl.
| | | |
|---|---|---|
| H04W 12/37 | (2021.01) | |
| G06F 21/32 | (2013.01) | |
| H04W 12/06 | (2021.01) | |

(52) U.S. Cl.
CPC ............ *G06F 21/32* (2013.01); *H04W 12/06* (2013.01)

(58) Field of Classification Search
CPC .......... G06F 21/32; G06F 21/30; G06F 21/45; H04W 12/06
See application file for complete search history.

(56) References Cited

U.S. PATENT DOCUMENTS

| | | | |
|---|---|---|---|
| 6,441,482 B1 * | 8/2002 | Foster | G06K 9/00013 257/291 |
| 8,381,969 B1 | 2/2013 | Miller et al. | |
| 8,423,462 B1 | 4/2013 | Amacker et al. | |
| 8,521,131 B1 | 8/2013 | Ramalingam et al. | |
| 8,744,966 B1 | 6/2014 | Amacker et al. | |
| 8,965,170 B1 | 2/2015 | Benea | |
| 9,107,064 B1 | 8/2015 | Ramalingam et al. | |
| 9,166,961 B1 | 10/2015 | Johansson et al. | |
| 9,202,105 B1 | 12/2015 | Wang et al. | |
| 9,324,098 B1 | 4/2016 | Agrawal et al. | |
| 9,386,507 B1 | 7/2016 | Ramalingam et al. | |
| 9,607,138 B1 | 3/2017 | Baldwin et al. | |
| 9,609,577 B1 | 3/2017 | Ramalingam et al. | |
| 9,681,350 B1 | 6/2017 | Marupaduga et al. | |
| 9,681,359 B2 | 6/2017 | Ramalingam et al. | |
| 9,723,131 B1 | 8/2017 | Ramalingam et al. | |
| 9,805,213 B1 * | 10/2017 | Kragh | H04L 63/0861 |
| 9,836,642 B1 | 12/2017 | Ramaswamy | |
| 9,934,504 B2 | 4/2018 | Wang et al. | |
| 9,967,250 B2 | 5/2018 | Johansson et al. | |
| 10,027,662 B1 | 7/2018 | Mutagi et al. | |
| 10,055,740 B2 | 8/2018 | Hanson et al. | |

(Continued)

*Primary Examiner* — Tongoc Tran
(74) *Attorney, Agent, or Firm* — Brownstein Hyatt Farber Schreck, LLP

(57) ABSTRACT

A system for authorizing a mobile identity information controlled device includes a mobile identity information controlled device, an identity system device, and/or an enabling device. At least one digital representation of a biometric is received using a biometric reader device. Identity information is obtained from an identity system device using the at least one digital representation of the biometric. Operation of the mobile identity information controlled device is controlled using the identity information. In some examples, the operation may subsequently be deauthorized if the at least one digital representation of the biometric and/or the identity information is not reobtained.

20 Claims, 14 Drawing Sheets

(56) References Cited

U.S. PATENT DOCUMENTS

| | | | |
|---|---|---|---|
| 10,104,181 B1 | 10/2018 | Rao et al. | |
| 10,108,791 B1 | 10/2018 | Masterman | |
| 10,108,961 B2 | 10/2018 | Wang et al. | |
| 10,122,727 B2 | 11/2018 | Johansson et al. | |
| 10,235,669 B2 | 3/2019 | Amacker et al. | |
| 10,242,364 B2 | 3/2019 | Wang et al. | |
| 10,243,945 B1 | 3/2019 | Kruse et al. | |
| 10,255,419 B1* | 4/2019 | Kragh | G16H 40/63 |
| 10,402,797 B2* | 9/2019 | Efroni | H04L 9/12 |
| 10,523,671 B1* | 12/2019 | Whitman | H04L 63/0861 |
| 10,762,182 B2* | 9/2020 | Hsu | G06F 3/044 |
| 11,151,481 B1 | 10/2021 | Sun et al. | |
| 11,538,092 B2* | 12/2022 | D'Haenens | G06Q 50/265 |
| 2004/0221303 A1 | 11/2004 | Sie | |
| 2013/0336546 A1* | 12/2013 | Pritikin | G06K 9/00892 |
| | | | 382/116 |
| 2014/0189720 A1 | 7/2014 | Terrazas | |
| 2014/0230047 A1* | 8/2014 | Scully-Power | G06Q 20/40145 |
| | | | 726/19 |
| 2014/0363058 A1* | 12/2014 | Emmett | G06V 40/193 |
| | | | 382/117 |
| 2015/0294515 A1 | 10/2015 | Bergdale | |
| 2016/0087952 A1* | 3/2016 | Tartz | H04W 12/06 |
| | | | 455/411 |
| 2016/0142394 A1* | 5/2016 | Ullrich | H04W 4/029 |
| | | | 726/7 |
| 2016/0189063 A1 | 6/2016 | Nie | |
| 2016/0328577 A1* | 11/2016 | Howley | G16H 20/60 |
| 2016/0330626 A1* | 11/2016 | Barillaud | H04L 41/00 |
| 2017/0188103 A1 | 6/2017 | Pan | |
| 2018/0007060 A1 | 1/2018 | Leblang et al. | |
| 2019/0036939 A1 | 1/2019 | Johansson et al. | |
| 2019/0050631 A1 | 2/2019 | Hayase | |
| 2019/0130410 A1* | 5/2019 | Nicoletti | G06Q 20/326 |
| 2020/0068399 A1* | 2/2020 | Brown | H04W 12/72 |
| 2020/0162592 A1* | 5/2020 | Goeltner | A61B 5/02 |

\* cited by examiner

MOBILE IDENTITY INFORMATION CONTROLLED DEVICE

CROSS-REFERENCE TO RELATED APPLICATION(S)

This application is a nonprovisional patent application of and claims the benefit of U.S. Provisional Patent Application No. 62/812,345, filed Mar. 1, 2019 and titled "Mobile Identity Information Controlled Device," the disclosure of which is hereby incorporated herein by reference in its entirety.

FIELD

The described embodiments relate generally to devices that have controlled operation states. More particularly, the present embodiments relate to mobile devices that have operation states controlled based on identity information.

BACKGROUND

People use a wide variety of different electronic devices. Examples of such electronic devices include desktop computing devices, laptop computing devices, mobile computing devices, wearable devices, smart phones, tablet computing devices, printers, displays, televisions, digital media players, thermostats, kitchen appliances, vehicles, vaporizer devices, navigation devices, entertainment devices, power tools, climate control devices, lighting devices, security devices, smart houses or other smart buildings, and so on.

The use of some electronic devices may be controlled. In some cases, only people with certain identity information associated with their identities (such as age, name, financial status, criminal status, personal history, and so on) may be allowed to operate an electronic device and/or to operate certain functions of an electronic device. For example, in various situations, operation of a vehicle may be restricted to people who are at least sixteen years of age.

SUMMARY

The present disclosure relates to a system for authorizing a mobile identity information controlled device. At least one digital representation of a biometric may be received using a biometric reader device. Identity information may be obtained from an identity system device using the at least one digital representation of the biometric. Operation of a mobile identity information controlled device may be controlled using the identity information. In this way, operation of a mobile identity information controlled device may be controlled using identity information while protecting access to the identity information. This may enable performance of functions not previously performable by the system, reduce the number of system components, prevent duplication of components, prevent identity information and/or biometric data from being stored by the mobile identity information controlled device, minimize communication connection traffic, improve the efficiency and/or operation of the system, and so on.

In various embodiments, a system for authorizing a mobile identity information controlled device includes a non-transitory storage medium that stores instructions, a biometric reader device, at least one communication unit, and a processor. The processor executes the instructions to communicate with the mobile identity information controlled device using the at least one communication unit, receive at least one digital representation of a biometric using the biometric reader device, obtain identity information from an identity system device, via the at least one communication unit, using the at least one digital representation of the biometric, and determine whether to transmit an authorization signal to the mobile identity information controlled device using the at least one communication unit based on the identity information.

In some examples, the at least one digital representation of the biometric is a digital representation of at least one of a fingerprint, a voiceprint, a facial image, a retina image, an iris image, a deoxyribonucleic acid sequence, a heart rhythm, or a gait. In a number of examples, the biometric reader device is at least one of a fingerprint scanner, an optical fingerprint scanner, a phosphorescent fingerprint scanner, a camera, an image sensor, a saliva sensor, a deoxyribonucleic acid sensor, a heart rhythm monitor, or a microphone.

In various examples, the at least one communication unit is a short-range communication unit and a long-range communication unit, the processor communicates with the mobile identity information controlled device using the short-range communication unit, and the processor obtains the identity information from the identity system device using the long-range communication unit. In some implementations of such examples, the short-range communication unit is at least one of a near-field communication unit, a Bluetooth communication unit, or a Bluetooth Low Energy communication unit and the long-range communication unit is a WiFi communication unit or a cellular communication unit.

In a number of examples, the mobile identity information controlled device is configured to deauthorize after receiving the authorization signal if the communication between the mobile identity information controlled device and the at least one communication unit is interrupted. In various examples, the processor determines to transmit the authorization signal to the mobile identity information controlled device based on a verified age included in the identity information. In a number of examples, the mobile identity information controlled device is a vehicle, a vaporizer, or a media player.

In some embodiments, a mobile identity information controlled device includes a non-transitory storage medium that stores instructions, a biometric reader device, a communication unit operative to communicate with an enabling device, and a controller. The controller executes the instructions to receive at least one digital representation of a biometric using the biometric reader device, transmit the at least one digital representation of the biometric to the enabling device using the communication unit, and determine whether to authorize operation of the mobile identity information controlled device based on identity information obtained by the enabling device from an identity system device using the at least one digital representation of the biometric.

In various examples, the at least one digital representation of the biometric is a first biometric and the controller is operative to receive a second biometric via the biometric reader device and deauthorize operation of the mobile identity information controlled device when the second biometric mismatches the first biometric. In some implementations of such examples, the controller attempts to reauthorize operation of the mobile identity information controlled device by transmitting the second biometric to the enabling device using the communication unit.

In some examples, the controller deauthorizes operation of the mobile identity information controlled device upon determining that communication with the enabling device is interrupted. In a number of examples, the mobile identity information controlled device is a vehicle, a vaporizer, or a media player. In various examples, the biometric reader device is at least one of a fingerprint scanner, an optical fingerprint scanner, a phosphorescent fingerprint scanner, a camera, an image sensor, a saliva sensor, a deoxyribonucleic acid sensor, a heart rhythm monitor, or a microphone. In a number of examples, the at least one digital representation of the biometric is a digital representation of at least one of a fingerprint, a voiceprint, a facial image, a retina image, an iris image, a deoxyribonucleic acid sequence, a heart rhythm, or a gait. In some examples, the communication unit is at least one of a near-field communication unit, a Bluetooth communication unit, or a Bluetooth Low Energy communication unit.

In various embodiments, a mobile identity information controlled device includes a non-transitory storage medium that stores instructions, a biometric reader device, a communication unit, and a controller. The controller executes the instructions to receive at least one digital representation of a biometric using the biometric reader device; obtain identity information from an identity system device, via the communication unit, using the at least one digital representation of the biometric; and determine whether to authorize operation of the mobile identity information controlled device based on a verified age included in the identity information.

In some examples, the mobile identity information controlled device is a vehicle, a vaporizer, or a media player. In a number of examples, the at least one digital representation of the biometric is a digital representation of at least one of a fingerprint, a voiceprint, a facial image, a retina image, an iris image, a deoxyribonucleic acid sequence, a heart rhythm, or a gait. In various examples, the biometric reader device is at least one of a fingerprint scanner, an optical fingerprint scanner, a phosphorescent fingerprint scanner, a camera, an image sensor, a saliva sensor, a deoxyribonucleic acid sensor, a heart rhythm monitor, or a microphone.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
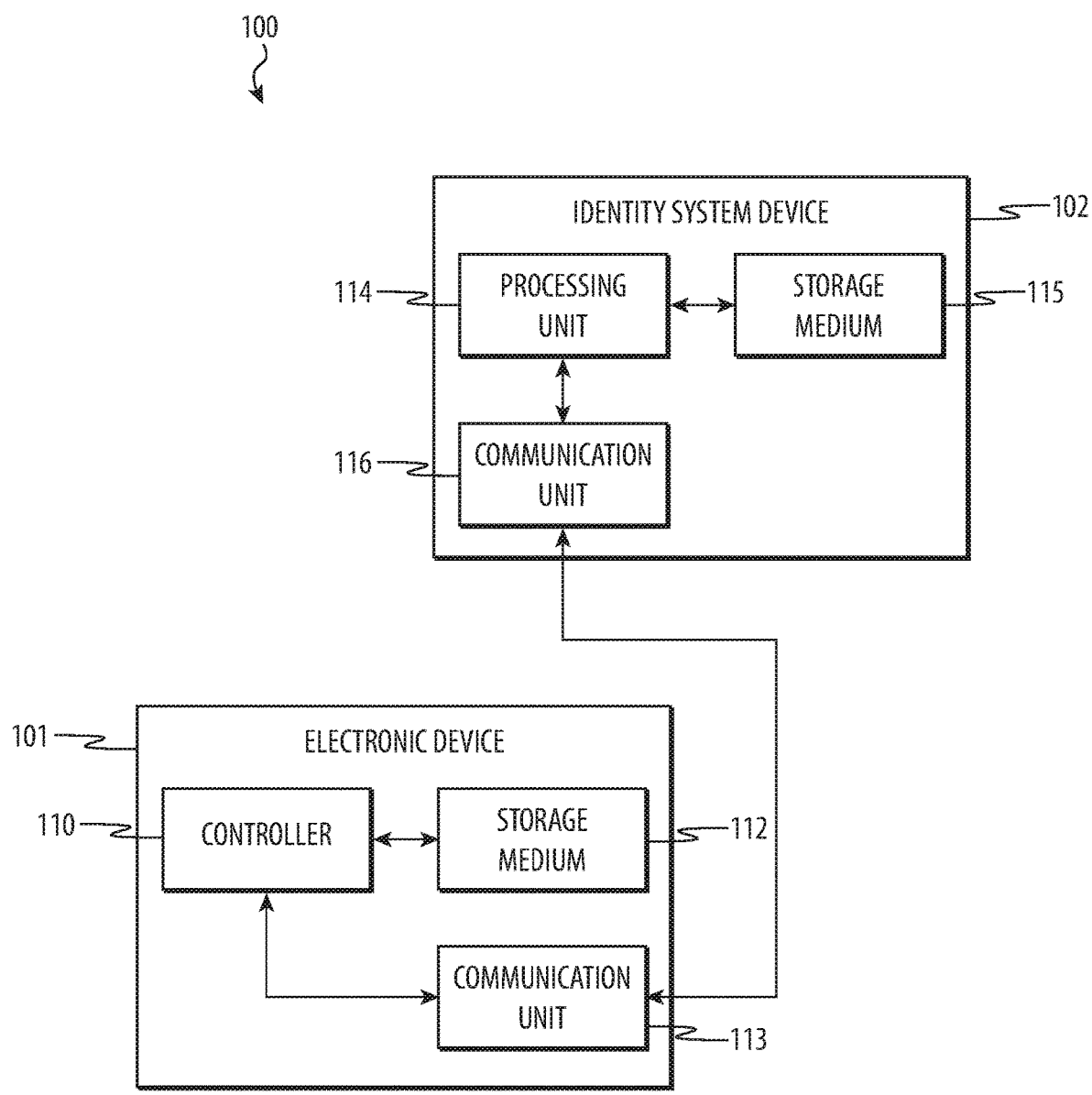
FIG. 1 depicts a first example system for authorizing a mobile identity information controlled device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, apparatuses, methods, and computer program products that embody various elements of the present disclosure. However, it should be understood that the described disclosure may be practiced in a variety of forms in addition to those described herein.

Different approaches may be used to control all or part of the operation of an electronic device based on various different identity information. For example, retailers may only sell age-restricted electronic devices to people who are at least the appropriate age and provide a government issued identification proving their age. However, a legitimate purchaser may then provide the age-restricted electronic device to an underage person. By way of another example, an age-restricted electronic device may be configured with electronic components that scan a government issued identification, verify that the government issued identification is valid and for that person, and that the government issued identification evidences that the person is at least the appropriate age. However, such components may significantly increase the size and cost of an electronic device, as well as increase the resources the electronic device consumes.

The following disclosure relates to a system for authorizing a mobile identity information controlled device. At least one digital representation of a biometric may be received using a biometric reader device. Identity information may be obtained from an identity system device using the at least one digital representation of the biometric. Operation of a mobile identity information controlled device may be controlled using the identity information. In this way, operation of a mobile identity information controlled device may be controlled using identity information while protecting access to the identity information. This may enable performance of functions not previously performable by the system, reduce the number of system components, prevent duplication of components, prevent identity information and/or biometric data from being stored by the mobile identity information controlled device, minimize communication connection traffic, improve the efficiency and/or operation of the system, and so on.

In some embodiments, the mobile identity information controlled device may include the biometric reader device and the mobile identity information controlled device may communicate with the identity system device. In other embodiments, the mobile identity information controlled device may communicate with an enabling device that includes the biometric reader and/or communicates with the identity system device in order to authorize operation.

In various embodiments, the digital representation of the biometric may be reobtained each time that the mobile identity information controlled device is operated. If the digital representation is not reobtained (which may involve reobtaining the identity information, comparing the digital representation of the biometric to a previous one used to obtain the identity information, and so on), operation may be deauthorized. This may prevent a person from providing the digital representation of the biometric to authorize operation and then providing the mobile identity information controlled device to another person. In other embodiments, the digital representation of the biometric may be reobtained upon the occurrence of a condition, such as movement of the mobile identity information controlled device, alteration of the mobile identity information controlled device, expiration of a time period, interruption of a communication connection between the mobile identity information controlled device and an enabling device and/or the identity system device, receipt of a deauthorization signal, travel of the mobile identity information controlled device away from an enabling device, and so on. This may balance fraud prevention with network communication, efficient operation, and so on.

These and other embodiments are discussed below with reference to FIGS. 1-14. However, those skilled in the art will readily appreciate that the detailed description given herein with respect to these Figures is for explanatory purposes only and should not be construed as limiting.

FIG. 1 depicts a first example system 100 for authorizing a mobile identity information controlled device. The system 100 may include an electronic device 101, which may be a mobile identity information controlled device and/or an enabling device for a mobile identity information controlled device. The system 100 may also include an identity system device 102.

The electronic device 101 may be any kind of device. Examples of such devices include, but are not limited to, one or more desktop computing devices, laptop computing devices, mobile computing devices, wearable devices, tablet computing devices, mobile telephones, smart phones, printers, displays, vehicles, kitchen appliances, vaporizers, entertainment system devices, digital media players, smart houses or other smart buildings, and so on. The electronic device may include one or more controllers 110 and/or other processors and/or processing units, one or more non-transitory storage media 112 (which may take the form of, but is not limited to, a magnetic storage medium; optical storage medium; magneto-optical storage medium; read only memory; random access memory; erasable programmable memory; flash memory; and so on), one or more communication units 113, and/or one or more other components (such as one or more biometric reader devices, input/output components, buttons, sensors, and so on). The controller 110 may execute one or more sets of instructions stored in the non-transitory storage media 112 to perform various functions, such as obtaining identification information, communicating with the identity system device 102 via the communication unit 113, and so on.

Similarly, the identity system device 102 may include one or more processing units 114, non-transitory storage media 115, communication units 116, and/or other components. The processing unit 114 may execute one or more sets of instructions stored in the non-transitory storage media 115 to perform various functions, such as receiving identification information, comparing identification information to stored identification information to determine associated stored identity information, communicating with the electronic device 101 via the communication unit 116, and so on.

The electronic device 101 may be operable to receive identification information, such as one or more hashes and/or other digital representations of one or more biometrics, one or more account logins, one or more passwords, and so on. The electronic device 101 may transmit the identification information directly and/or indirectly to the identity system device 102. The identity system device 102 may determine whether the identification information is associated with stored identity information (such as one or more names, addresses, phone numbers, social security numbers, credit card and/or other financial information, payment records, purchase and/or other behavior records, age and/or verified age, driver's license and/or other identification or authorization information, vehicle rental contract information, insurance verification, and so on). If so, the identity system device 102 may return and/or otherwise allow access to associated identity information and/or one or more attestations regarding such directly and/or indirectly to the electronic device 101 (such as whether a person is of at least a certain age, whether or not a person is authorized to operate a vehicle, and so on). The electronic device 101 may use the identity information and/or attestation regarding such to authorize and/or deny and/or otherwise restrict partial or full operation of the electronic device 101 and/or an associated device.

For example, the electronic device 101 may be a vehicle. The vehicle may include a biometric reader device, such as a fingerprint scanner, an optical fingerprint scanner, a phosphorescent fingerprint scanner, a camera, an image sensor, a saliva sensor, a deoxyribonucleic acid sensor, a heart rhythm monitor, a microphone, and so on. The vehicle may use the biometric reader device to obtain one or more digital representations of one or more biometrics (such as a digital representation of a fingerprint, a voiceprint, a facial image, a retina image, an iris image, a deoxyribonucleic acid sequence, a heart rhythm, a gait, and so on) for a person. The vehicle may transmit the digital representation of the biometric to the identity system device 102. The identity system device 102 may determine if stored identity information is associated with stored biometric data matching the digital representation of the biometric. The identity system device 102 may also determine whether such stored identity information indicates the person is of age to operate the vehicle, has insurance covering the vehicle, is a permitted operator of the vehicle, has a license to operate the vehicle, and so on. The identity system device 102 may return such information to the vehicle and/or one or more attestations regarding such. Using the information and/or attestation, the vehicle may allow and/or deny and/or otherwise restrict operation of the vehicle by the person.

In various embodiments, the electronic device 101 may reobtain the identification information and/or the identity information and/or attestation each time operation is attempted. If the electronic device 101 is not able to reobtain the identification information and/or the identity information and/or attestation, the electronic device may deauthorize operation. This may prevent a person from providing the identification information to authorize operation and then providing the electronic device 101 or an associated device to another person. In other embodiments, the electronic device 101 may reobtain the identification information and/or the identity information and/or attestation upon the occurrence of a condition, such as movement of the electronic device 101 or an associated device, alteration of the electronic device 101 or an associated device, expiration of a time period (such as ten minutes, one day, and so on), interruption of a communication connection between the electronic device 101 and another device (such as the identity system device 102, an associated device, and so on), receipt of a deauthorization signal, travel of the electronic device 101 away from an associated device and/or vice versa, and so on. This may balance fraud prevention with network communication, efficient operation, and so on.

Figure 2:
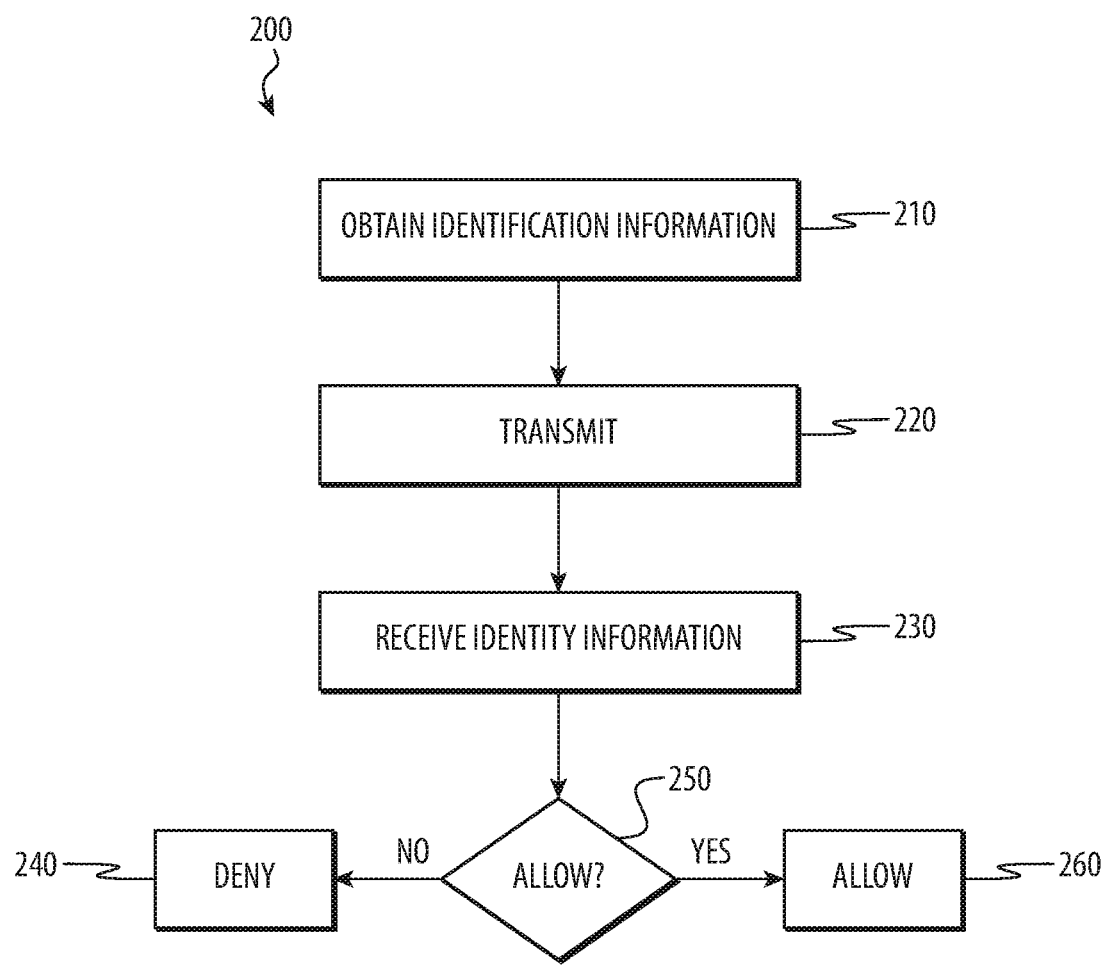
FIG. 2 depicts a flow chart illustrating a first example method for authorizing a mobile identity information controlled device. This method may be performed by the system of FIG. 1.

FIG. 2 depicts a flow chart illustrating a first example method 200 for authorizing a mobile identity information controlled device. This method 200 may be performed by the system 100 of FIG. 1.

At operation 210, an electronic device may obtain identification information. In some examples, the identification information may be at least one digital representation of a biometric obtained via a biometric reader device. The digital representation of the biometric may be a digital representation of a fingerprint, a voiceprint, a facial image, a retina image, an iris image, a deoxyribonucleic acid sequence, a heart rhythm, a gait, and so on. The biometric reader device may be a fingerprint scanner, an optical fingerprint scanner, a phosphorescent fingerprint scanner, a camera, an image sensor, a saliva sensor, a deoxyribonucleic acid sensor, a heart rhythm monitor, a microphone, and so on.

At operation 220, the electronic device may transmit the identification information to one or more identity system devices. In some examples, the electronic device may transmit the identification information via one or more intermediate devices. For example, the electronic device may use a short-range communication unit (such as a near-field communication unit, a Bluetooth communication unit, a Bluetooth Low Energy communication unit, and so on) to transmit the identification information to an intermediate device that in turn communicates with an identity system device using a long-range communication unit (such as a WiFi communication unit, a cellular communication unit, and so on).

At operation 230, the electronic device may receive identity information (such as a verified age of a person, a status of the person's driver's license, and so on). The electronic device may receive the identification information from an identity system device and/or an intermediate device in response to transmitting the identification information.

At operation 250, the electronic device may use the identity information to determine whether or not to allow operation (whether full operation, partial operation, and so on) of the electronic device and/or an associated electronic device. If not, the flow may proceed to operation 240 where the electronic device may deny operation. Otherwise, the flow may proceed to operation 260 where the electronic device allows the operation.

For example, a desktop computing device may include a video streaming application. The desktop computing device may receive login information for an associated account and transmit the login information to an identity system device. The identity system device may use the login information to determine whether or not there is payment record identity information indicating payment of a subscription fee for the video streaming application. If so, the identity system device may return an attestation indicating that the subscription fee was paid and the desktop computing device may allow operation of the video streaming application. Otherwise, the desktop computing device may deny operation of the video streaming application, but may allow operation of one or more other applications.

In various examples, this example method 200 may be implemented as a group of interrelated software modules or components that perform various functions discussed herein. These software modules or components may be executed within a cloud network and/or by one or more computing devices, such as the electronic device 101 of FIG. 1.

Although the example method 200 is illustrated and described as including particular operations performed in a particular order, it is understood that this is an example. In various implementations, various orders of the same, similar, and/or different operations may be performed without departing from the scope of the present disclosure.

For example, the method 200 is illustrated and described as the electronic device receiving the identity information. However, it is understood that this is an example. In some implementations, the electronic device may instead receive one or more attestations regarding the identity information. For example, the electronic device may receive an indication that the person meets a threshold age (such as 18, 21, and so on), is legally allowed to operate a vehicle, and so on. Various configurations are possible and contemplated without departing from the scope of the present disclosure.

In various implementations, there may be multiple tiers of authorizations for a mobile identity information controlled device. For example, tiers may include a tier for authorization to use all functions and/or components of a mobile identity information controlled device and full authorization to grant authorization to others, a tier for authorization to use a subset of functions and/or components of a mobile identity information controlled device and/or partial authorization to grant authorization to others, a tier for authorization to use all or a subset of functions and/or components of a mobile identity information controlled device but not authorization to grant authorization to others, a tier for authorization to grant authorization to others but not use all or a subset of functions and/or components of a mobile identity information controlled device, a tier for temporary authorization to either use all or a subset of functions and/or components of a mobile identity information controlled device and/or grant authorization to others, a tier for authorization under certain conditions (such as between certain hours, during daylight, when school is not in session, and so on). In some implementations, a person who has a higher tier of authorization may voluntarily restrict themselves to a lower tier in order to restrict his own use of the mobile identity information controlled device. Various configurations are possible and contemplated without departing from the scope of the present disclosure.

Figure 3:
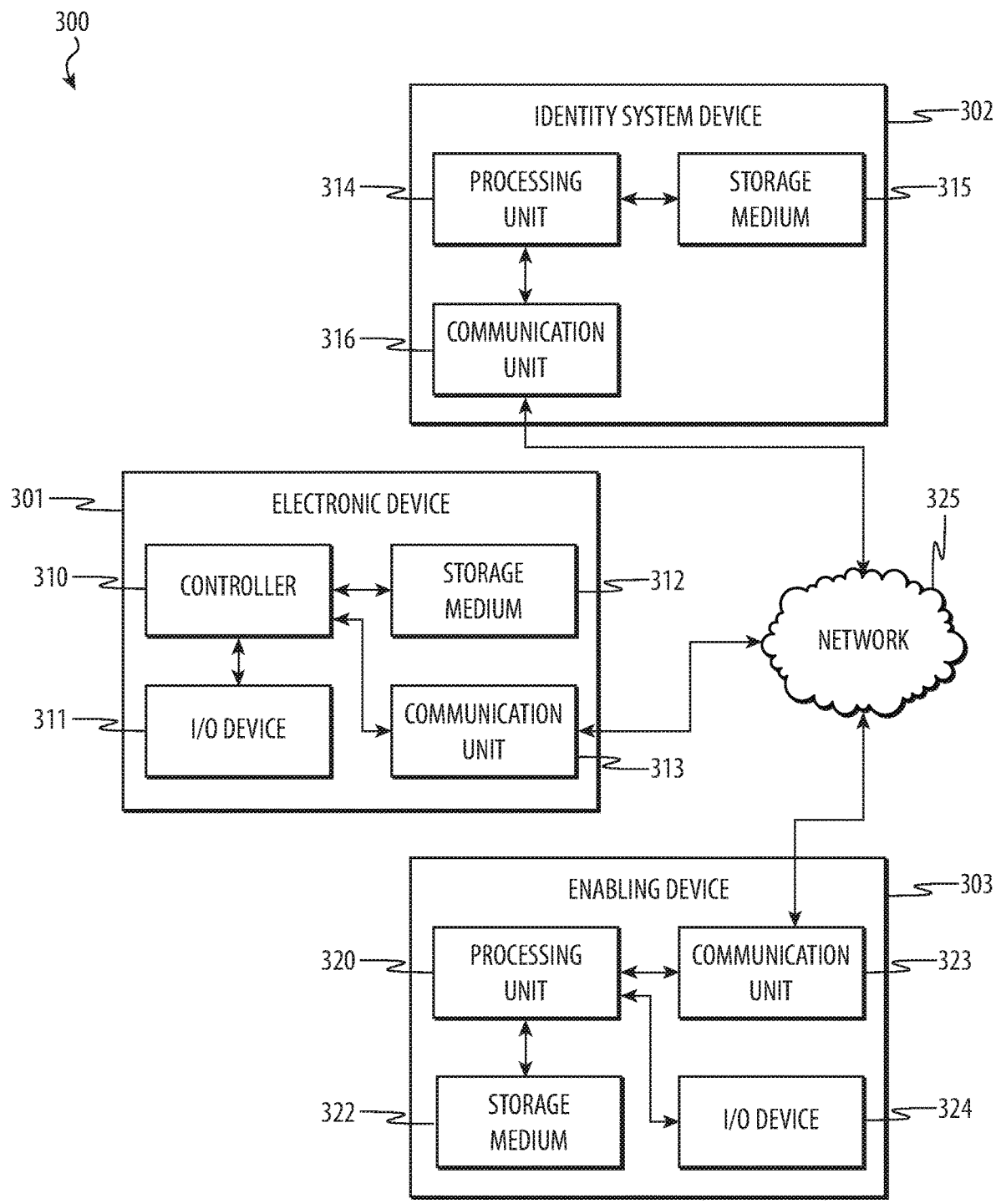
FIG. 3 depicts a second example system for authorizing a mobile identity information controlled device.

FIG. 3 depicts a second example system 300 for authorizing a mobile identity information controlled device. The system 300 may include an enabling device 303 that may communicate with an electronic device 301 and/or an identity system device 302 via one or more communication networks 325.

The enabling device 303 may include one or more processing units 320, non-transitory storage media 322, communication units 323, input/output devices 324, and/or other components. Similarly, the electronic device 301 may include one or more controllers 310, non-transitory storage media 312, communication units 313, input/output devices 311, and/or other components. Likewise, the identity system device 302 may include one or more processing units 314, non-transitory storage media 315, communication units 316, and/or other components.

The processing unit 320 of the enabling device 303 may execute one or more instructions stored in the non-transitory storage medium 322 to perform various functions. For example, the processing unit 320 may receive identification information via the input/output device 324, transmit the identification information to the identity system device 302 via the communication unit 323, receive identity information from the identity system device 302 via the communication unit 323, determine whether to allow or refuse operation of the electronic device 301 using the identification information, and transmit one or more authorization, deauthorization, and/or other signals to the electronic device 301 via the communication unit 323.

Figure 4:
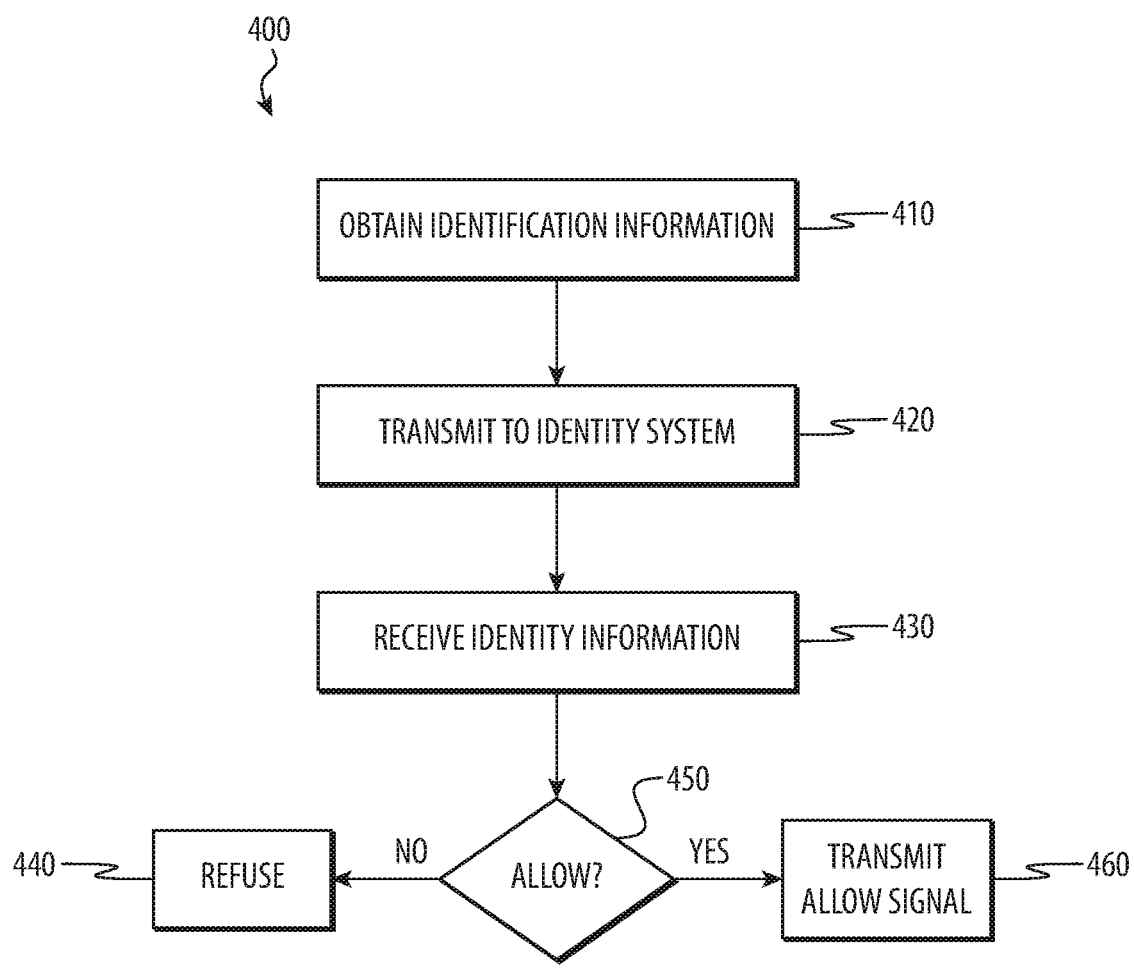
FIG. 4 depicts a flow chart illustrating a second example method for authorizing a mobile identity information controlled device. This method may be performed by the system of FIG. 3.

FIG. 4 depicts a flow chart illustrating a second example method 400 for authorizing a mobile identity information controlled device. This method 400 may be performed by the system 300 of FIG. 3.

At operation 410, an electronic device may obtain identification information. At operation 420, the electronic device may transmit the identification information to an identity system. At operation 430, the electronic device may receive identity information from the identification system in response to transmitting the identification information.

At operation 450, the electronic device may determine whether or not to allow operation of an associated electronic device using the identity information. If not, the flow may proceed to operation 440 where the electronic device may refuse to allow operation of the associated electronic device. Otherwise, the flow may proceed to operation 460 where the electronic device may transmit an allow signal to the associated electronic device.

Upon receipt of the allow signal, the associated electronic device may allow operation.

For example, a smart phone may be configured to operate as an enabling device for a digital media player. The digital media player may be configured with a short-range communication unit, such as a Bluetooth communication unit, but may not have a long-range communication unit. The smart phone may be configured with both a short-range communication unit and a long-range communication unit, such as a WiFi communication unit or a cellular communication unit. An identity system device may be accessible using a long-range communication unit, but not a short-range communication unit. However, the smart phone and the digital media player may be operable to communicate using a short-range communication unit. As such, the smart phone may be configured to communicate with the identity system device on behalf of the digital media player to authorize operation to make up for the inability of the digital media player to communicate directly. The smart phone may obtain identification information, communicate with the identity system device using the long-range communication unit, and communicate with the digital media player using the short-range communication unit to authorize operation (if appropriate).

In various examples, this example method 400 may be implemented as a group of interrelated software modules or components that perform various functions discussed herein. These software modules or components may be executed within a cloud network and/or by one or more computing devices, such as the electronic device 301 and/or the enabling device 303 of FIG. 3.

Although the example method 400 is illustrated and described as including particular operations performed in a particular order, it is understood that this is an example. In various implementations, various orders of the same, similar, and/or different operations may be performed without departing from the scope of the present disclosure.

For example, the above illustrates and describes the electronic device obtaining the identification information. However, it is understood that this is an example. In some implementations, the electronic device may receive the identification information from the same device to which the electronic device transmits the allow signal. Various configurations are possible and contemplated without departing from the scope of the present disclosure.

Figure 5:
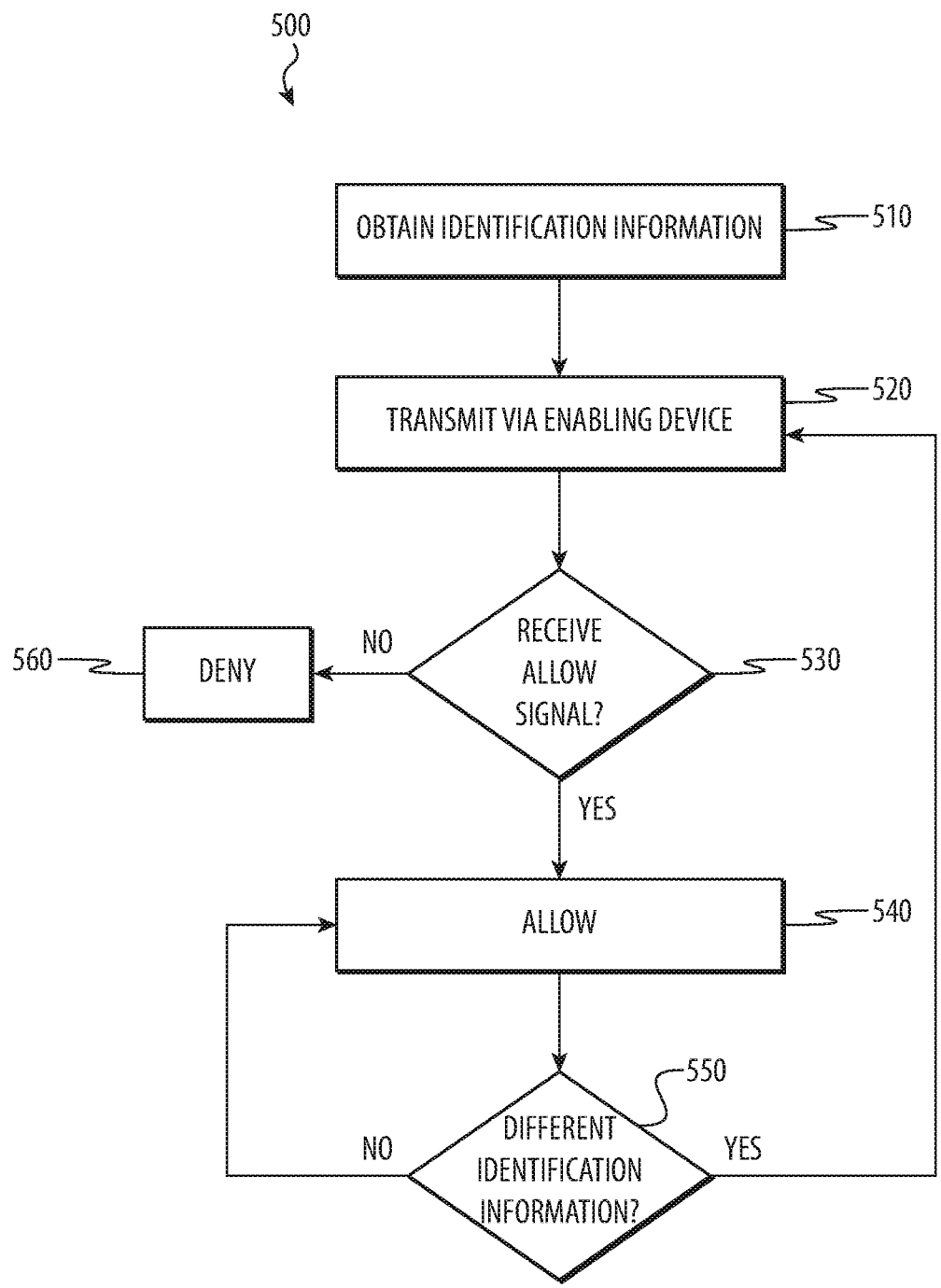
FIG. 5 depicts a flow chart illustrating a third example method for authorizing a mobile identity information controlled device. This method may be performed by the system of FIG. 3.

FIG. 5 depicts a flow chart illustrating a third example method 500 for authorizing a mobile identity information controlled device. This method 500 may be performed by the system 300 of FIG. 3.

At operation 510, an electronic device may obtain identification information. At operation 520, the electronic device may transmit the identification information via an enabling device. At operation 530, the electronic device may determine whether or not an allow signal is received. For example, the allow signal may be received from the enabling device. If so, the flow may proceed to operation 540 where the electronic device may allow operation. Otherwise, the flow may proceed to operation 560 where the electronic device may deny operation.

After the electronic device allows operation at operation 540, the flow may proceed to operation 550 where the electronic device determines whether or not different identification information is received. If so, the flow may proceed to operation 520 where the electronic device transmits the different identification information via an enabling device. Otherwise, the flow may return to operation 540 where the electronic device may continue to allow operation.

For example, a digital media player may be configured to use a smart phone as an enabling device. The digital media player may be configured to obtain a digital representation of a biometric of a person and transmit the digital representation of the biometric to the smart phone. The smart phone may be configured to transmit the received digital representation of the biometric to an identity system device and receive information back indicating whether or not the person is at least 18 years of age. If so, the smart phone may transmit an allow signal to the digital media player to allow operation of the digital media player to present R rated content and/or other content restricted to people who are 18 years of age or more.

In various examples, this example method may be implemented as a group of interrelated software modules or components that perform various functions discussed herein. These software modules or components may be executed within a cloud network and/or by one or more computing devices, such as the electronic device 301 and/or the enabling device 303 of FIG. 3.

Although the example method 500 is illustrated and described as including particular operations performed in a particular order, it is understood that this is an example. In various implementations, various orders of the same, similar, and/or different operations may be performed without departing from the scope of the present disclosure.

For example, the method 500 is illustrated and described as obtaining the identification information and transmitting such to the enabling device. However, in some implementations, the enabling device may obtain the identification information, transmit the identification information to one or more identity system devices, and transmit one or more allow or deny signals to one or more associated electronic devices accordingly. Various configurations are possible and contemplated without departing from the scope of the present disclosure.

Figure 6:
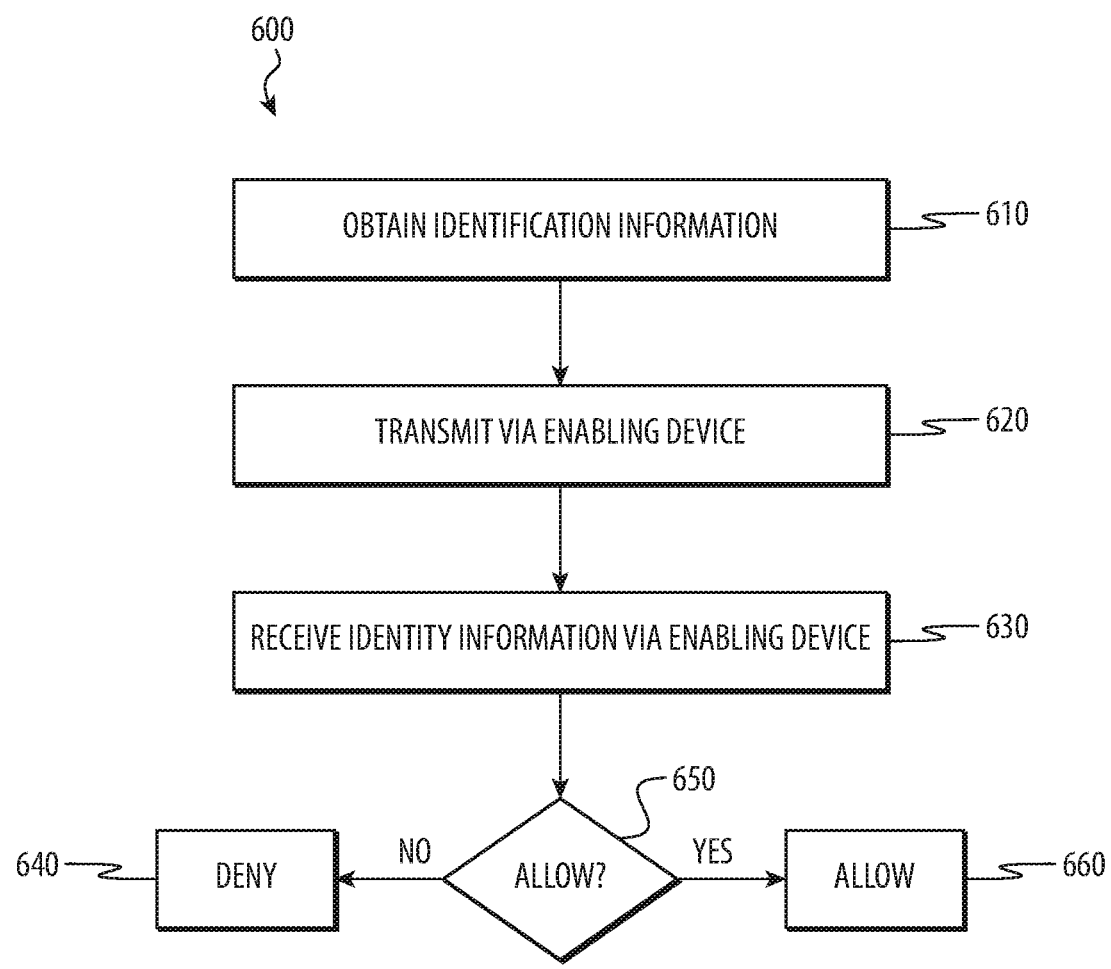
FIG. 6 depicts a flow chart illustrating a fourth example method for authorizing a mobile identity information controlled device. This method may be performed by the system of FIG. 3.

FIG. 6 depicts a flow chart illustrating a fourth example method 600 for authorizing a mobile identity information controlled device. This method 600 may be performed by the system 300 of FIG. 3.

At operation 610, an electronic device may obtain identification information. At operation 620, the electronic device may transmit the identification information via an enabling device. For example, the electronic device may transmit the identification information to an identity system device via the enabling device. At operation 630, the electronic device may receive identity information via the enabling device. For example, the electronic device may receive the identity information from an identity system device via the enabling device, such as in response to transmitting the identification information via the enabling device. The flow may then proceed to operation 650 where the electronic device determines whether or not to allow operation using the identity information. If so, the flow may proceed to operation 660 where the electronic device may allow operation. Otherwise, the flow may proceed to operation 640 where the electronic device may deny operation.

For example, the electronic device may be a vehicle. The vehicle may use a satellite navigation component associated with the vehicle to communicate with an identity system device. The vehicle may capture an image of a person's face, use the satellite navigation component to transmit a digital representation of the image to an identity system device, and receive information back from the identity system device via the satellite navigation component regarding whether or not the person is authorized to operate the vehicle.

In various examples, this example method 600 may be implemented as a group of interrelated software modules or components that perform various functions discussed herein. These software modules or components may be executed within a cloud network and/or by one or more computing devices, such as the electronic device 301 and/or the enabling device 303 of FIG. 3.

Although the example method 600 is illustrated and described as including particular operations performed in a particular order, it is understood that this is an example. In various implementations, various orders of the same, similar, and/or different operations may be performed without departing from the scope of the present disclosure.

For example, the method 600 is illustrated and described as using the same enabling device to transmit the identification information and receive the identity information. However, it is understood that this is an example. In some implementations, multiple enabling devices (such as different enabling devices used to transmit and receive information) may be used. Various configurations are possible and contemplated without departing from the scope of the present disclosure.

Further, the method 600 is illustrated and described as either allowing or denying operation. However, in some examples of various implementations, the electronic device may allow and/or deny operation of different functions or components of the electronic device instead of allowing and/or denying all operation. Various configurations are possible and contemplated without departing from the scope of the present disclosure.

Figure 7:
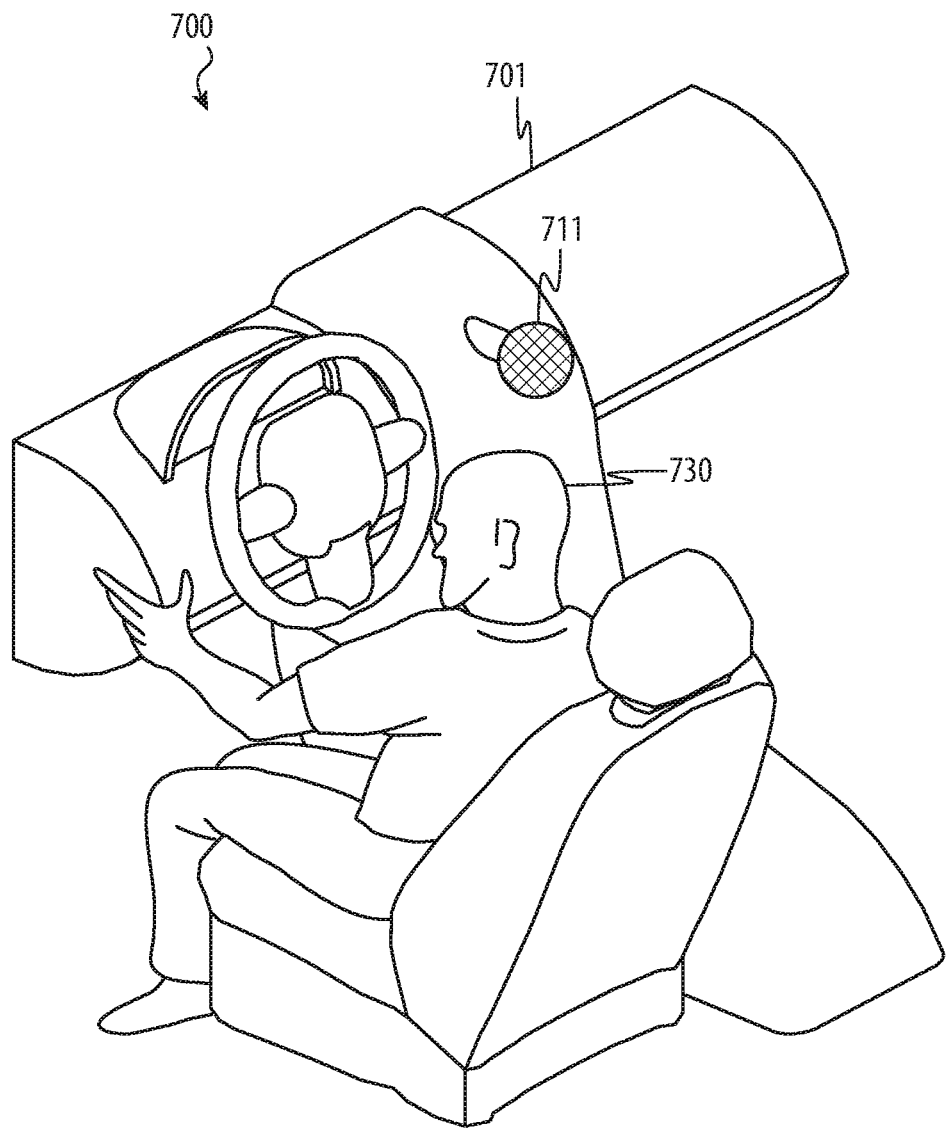
FIG. 7 depicts a third example system for authorizing a mobile identity information controlled device.

FIG. 7 depicts a third example system 700 for authorizing a mobile identity information controlled device. In this example, the system 700 may include a vehicle 701 that includes a microphone 711. The vehicle 701 may use the microphone 711 to obtain a digital representation of the voice of a person 730, transmit the digital representation of the voice to one or more identity system devices, receive information in return regarding whether or not the person is authorized to operate the vehicle, and allow and/or deny operation accordingly.

For example, the person may be authorized to operate the vehicle 701 if the person is at least 16 years of age, has a valid driver's license, has insurance that covers the vehicle 701, owns the vehicle 701, has a valid rental contract for the vehicle 701, is on a permitted operator list for the vehicle 701, and so on. In some examples, the person may be authorized for some operations of the vehicle 701 but not others and the vehicle 701 may allow and/or deny accordingly. By way of illustration, a driver who is 16 years of age may be permitted to drive the vehicle 701 but not use the radio while doing so. By way of another illustration, a person may be allowed to use the radio and/or climate control systems, but may not be allowed to drive. By way of another illustration, a person may be allowed to drive the vehicle 701 in certain areas but not others, at certain times but not others, at certain speeds but not others, and so on. Various configurations are possible and contemplated without departing from the scope of the present disclosure.

As described above, in various implementations, there may be multiple tiers of authorizations. For example, a parent may have full authorization to use the vehicle at any time, under any conditions, and full authorization to grant authorization to others. The parent may grant a more limited set of authorizations to a child, such as authorization to use the vehicle to drive between home and work, before dark, when school is not in session, for a temporary time (such as for the next five hours so the child can take the vehicle to go see a movie), and so on. The child may not have authorization to grant authorization to use the vehicle to others. Various configurations are possible and contemplated without departing from the scope of the present disclosure.

Figure 8:
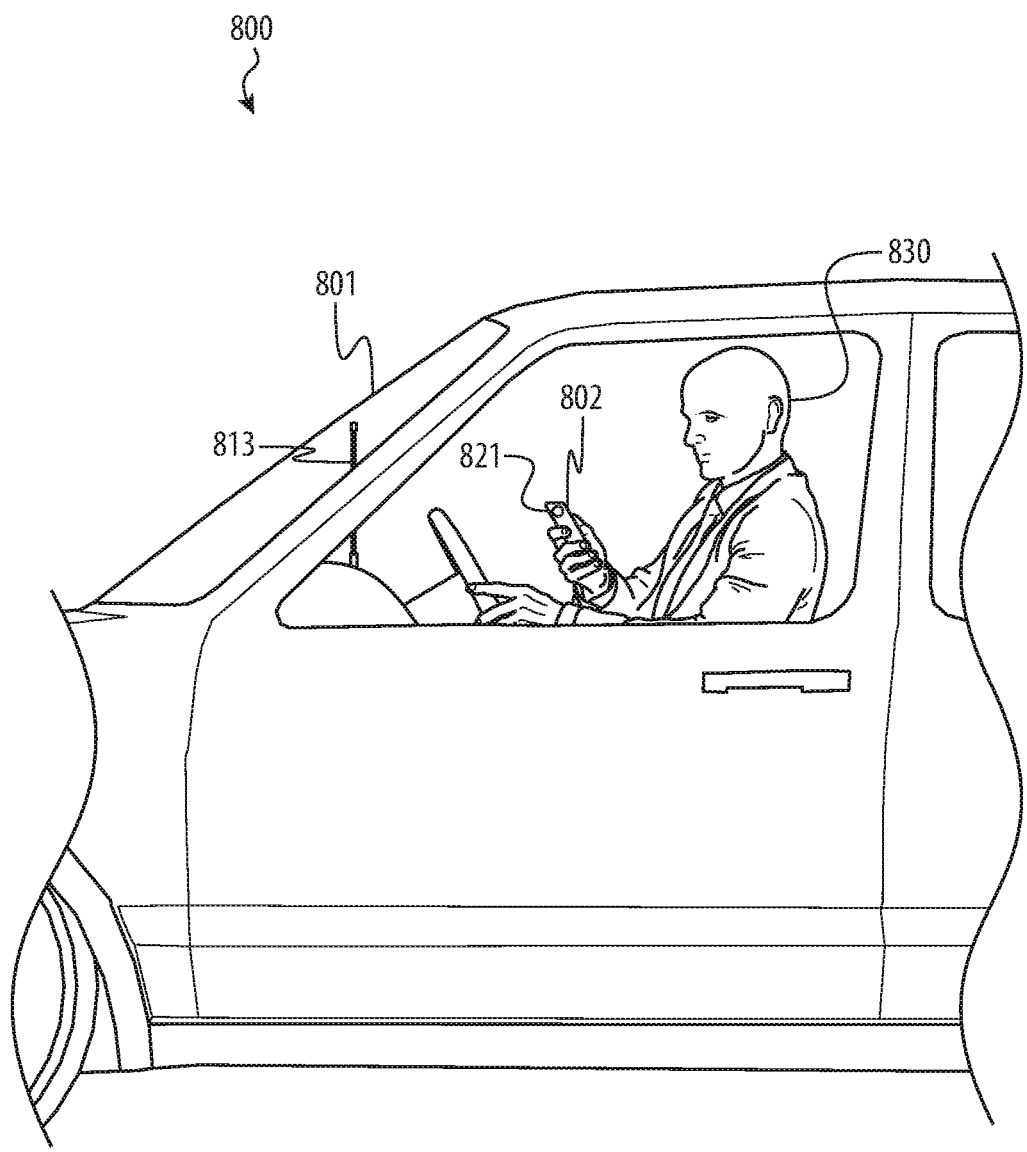
FIG. 8 depicts a fourth example system for authorizing a mobile identity information controlled device.

FIG. 8 depicts a fourth example system 800 for authorizing a mobile identity information controlled device. In this example, the system 800 may include a vehicle 801 that includes an antenna 813. A person 830 may have a mobile communication device 802 that includes a camera 821. The mobile communication device 802 may be operable to capture an image of the face of the person 830, transmit a digital representation of the face to an identity system device, receive identity information (that may indicate various information related to whether or not the person is authorized to use the vehicle 801), and transmit an allow and/or deny signal regarding operation of the vehicle 801 to the vehicle 801 via the antenna 813 using the identity information.

Figure 9:
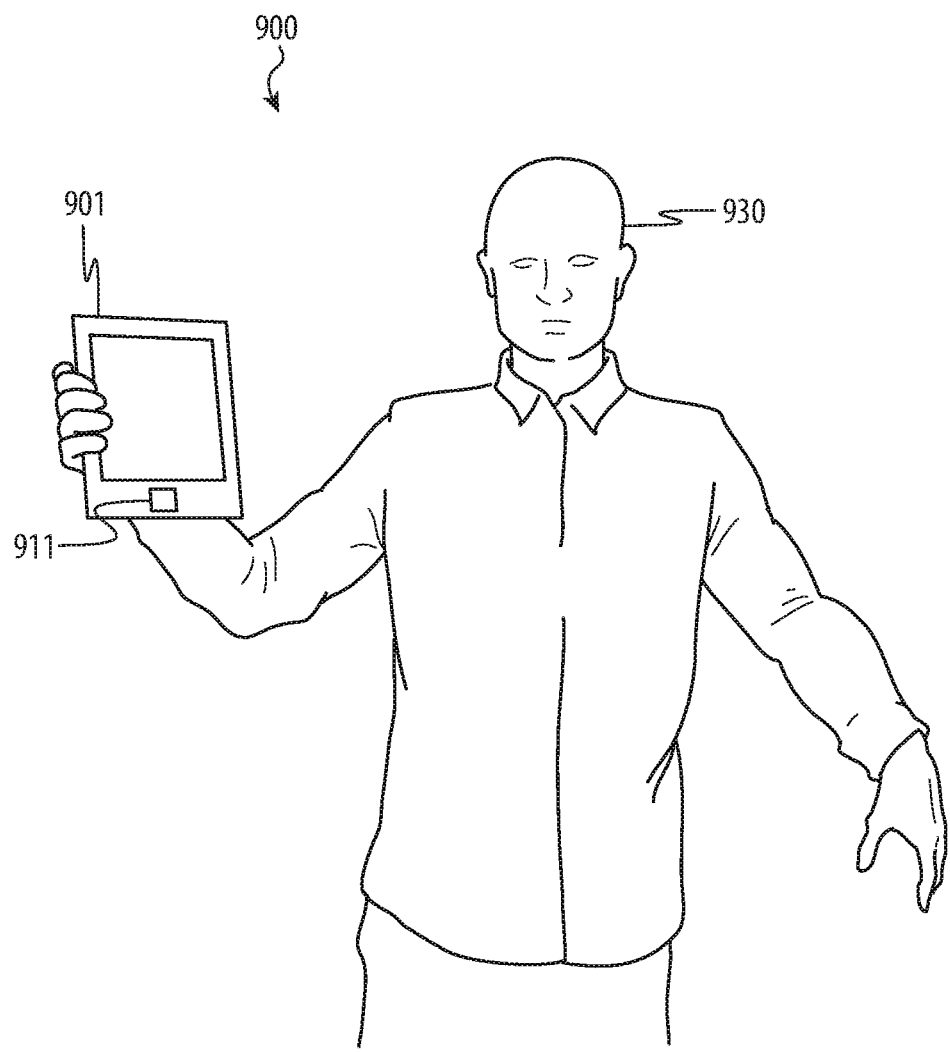
FIG. 9 depicts a fifth example system for authorizing a mobile identity information controlled device.

FIG. 9 depicts a fifth example system 900 for authorizing a mobile identity information controlled device. In this example, the system 900 may include a portable movie player 901 that includes a fingerprint sensor 911. The portable movie player 901 may be operable to receive a digital representation of a fingerprint of a person 930 using the fingerprint sensor 911, transmit the digital representation of the fingerprint to an identity system device, receive identity information from the identity system device regarding whether or not the person 930 has been granted permission to access movie content, and allow and/or deny operation to access movie content accordingly.

As described above, in various implementations, there may be multiple tiers of authorizations. For example, a parent may have full authorization to view any movie. The parent may grant a more limited set of authorizations to a child, such as authorization to see certain movies but not others, to see movies that have less than a particular rating (such as an 'R' rating), to see movies during certain hours (like between 5 and 8, when school is not in session, and so on), to see entertainment movies after watching educational movies, and so on. Various configurations are possible and contemplated without departing from the scope of the present disclosure.

Figure 10:
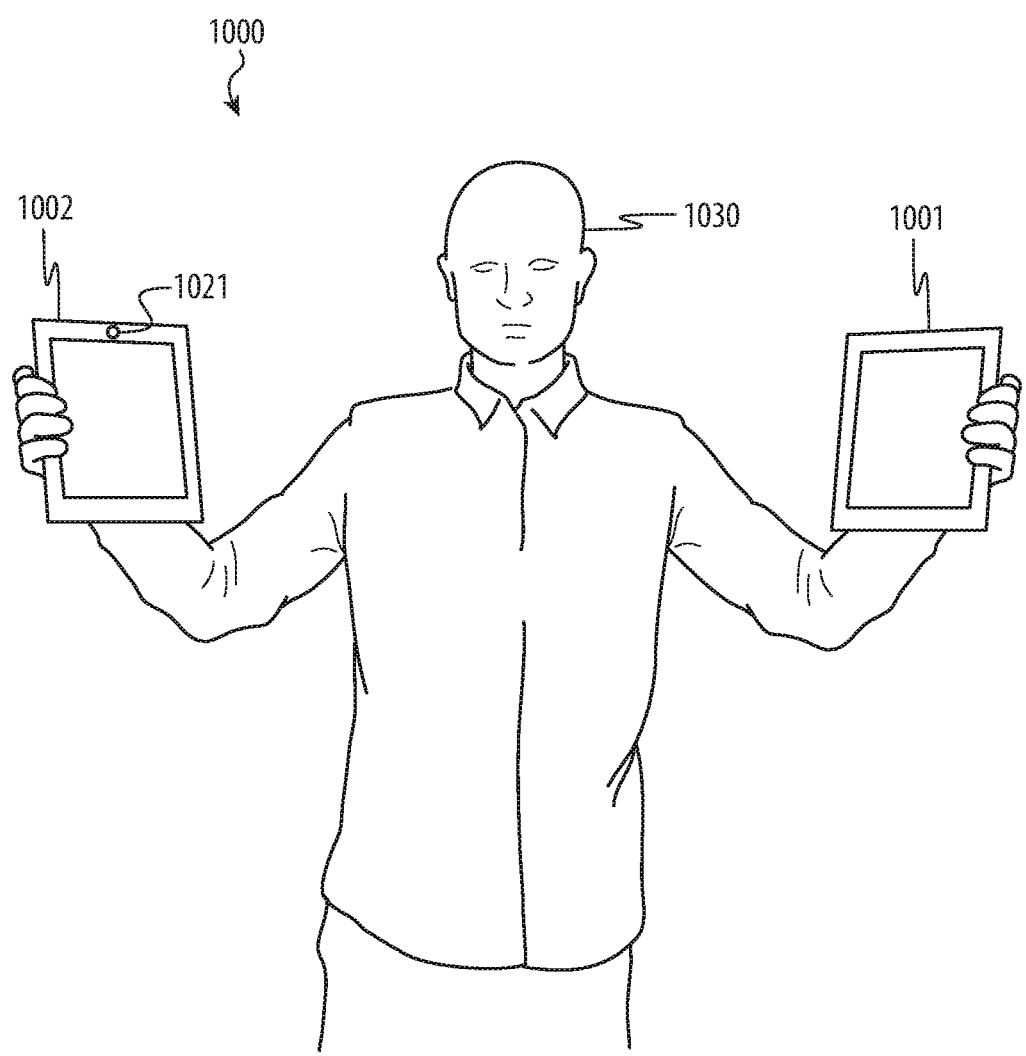
FIG. 10 depicts a sixth example system for authorizing a mobile identity information controlled device.

FIG. 10 depicts a sixth example system 1000 for authorizing a mobile identity information controlled device. In this example, the system 1000 may include a digital media player 1001 and a tablet computing device 1002 that includes a camera 1021. The tablet computing device 1002 may be operable to receive a digital representation of a face of a person 1030 using the camera 1021, transmit the digital representation of the face to an identity system device, receive identity information from the identity system device regarding whether or not the person 1030 has paid to access content, and transmit a signal to the digital media player 1001 to allow and/or deny operation of the digital media player 1001 and to access the content accordingly.

Figure 11:
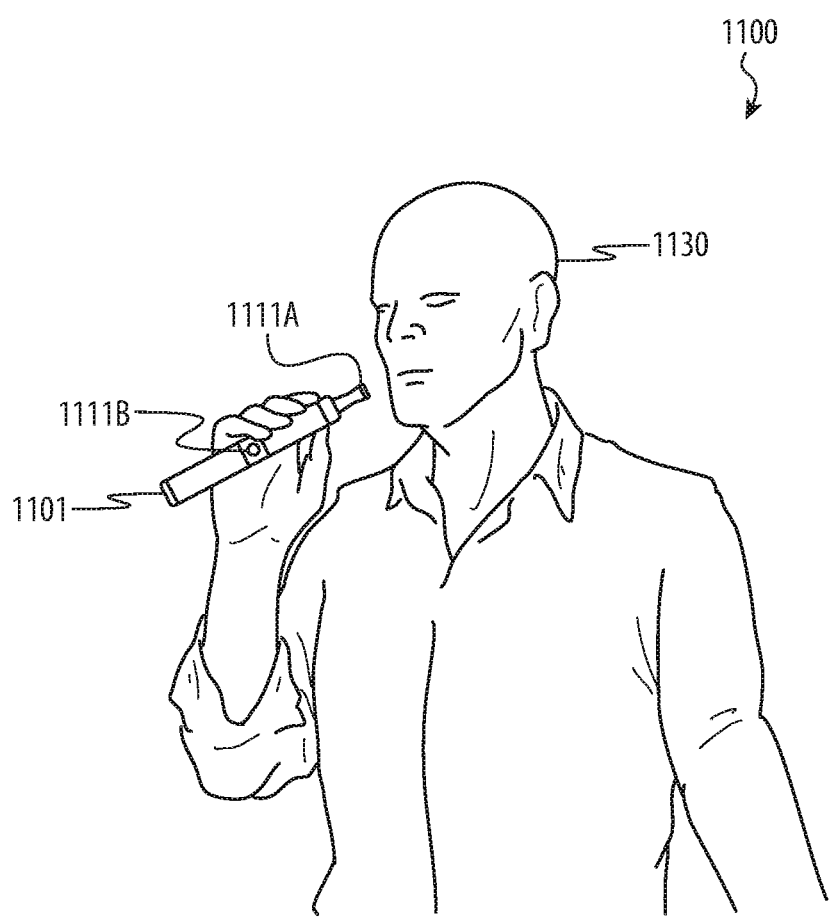
FIG. 11 depicts a seventh example system for authorizing a mobile identity information controlled device.

FIG. 11 depicts a seventh example system 1100 for authorizing a mobile identity information controlled device. In this example, the system 1100 may include a vaporizer 1101 with a saliva detector 1111A and a button 1111B. The vaporizer 1101 may be operable to obtain a digital representation of a deoxyribonucleic acid sequence for a person 1130 (and/or information that may be used to determine such) when the person 1130 puts the saliva detector 1111A to the mouth of the person 1130 and presses the button 1111B. The vaporizer 1101 may transmit the digital representation of the deoxyribonucleic acid sequence to an identity system device and receive an age of the person 1130 in response. The vaporizer 1101 may allow operation accordingly, such as allowing operation of the vaporizer 1101 if the person is at least 18 years of age.

In various embodiments, the vaporizer 1101 may reobtain the digital representation of the deoxyribonucleic acid sequence every time the vaporizer 1101 is operated. If the digital representation of the deoxyribonucleic acid sequence and/or the age of the person 1130 is not reobtained, the vaporizer 1101 may deauthorize operation. This may prevent the person 1130 from authorizing operation and then providing the vaporizer 1101 to another person.

In other embodiments, the vaporizer 1101 may reobtain the digital representation of the deoxyribonucleic acid sequence upon the occurrence of a condition, such as refilling or recharging of the vaporizer 1101, movement of the vaporizer 1101 outside of a geographic area (such as movement of over a mile, outside of a one block range, and so on), expiration of a time period, receipt of a deauthorization signal from another electronic device, detection of a different deoxyribonucleic acid sequence using the saliva detector 1111A, and so on.

In various embodiments, the vaporizer 1101 may store the digital representation of the deoxyribonucleic acid sequence after authorization. In such embodiments, the vaporizer 1101 may obtain and compare a digital representation of the deoxyribonucleic acid sequence to the stored one each time the vaporizer is operated. Upon a mismatch, the vaporizer 1101 may transmit the newly obtained digital representation of the deoxyribonucleic acid sequence to the identity system device to ensure that it is associated with identity information for a person who is at least 18 years of age. If not, the vaporizer 1101 may deauthorize operation.

Figure 12:
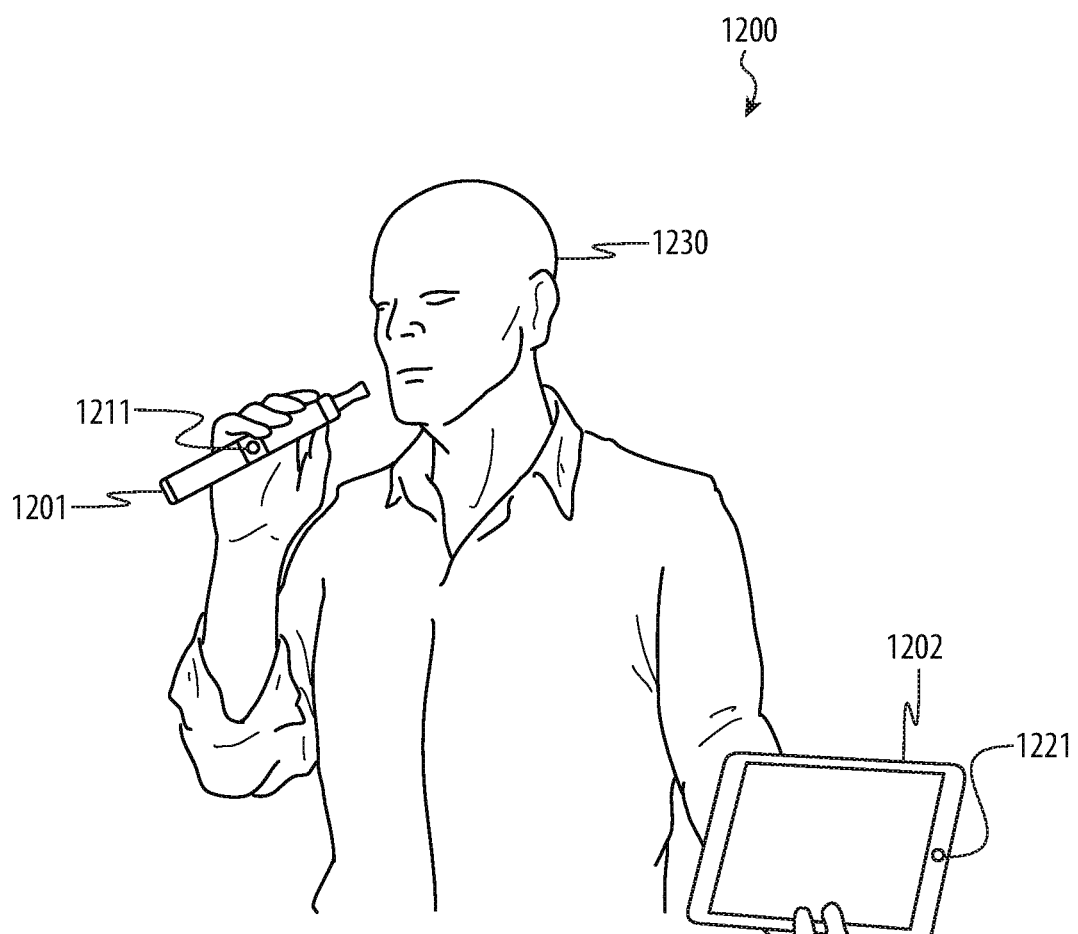
FIG. 12 depicts an eighth example system for authorizing a mobile identity information controlled device.

FIG. 12 depicts an eighth example system 1200 for authorizing a mobile identity information controlled device. In this example, the system 1200 may include a vaporizer 1201 and a tablet computing device 1202. The vaporizer 1201 may include a button 1211 and the tablet computing device 1202 may include a camera 1221.

The tablet computing device 1202 may be operable to capture an image of a face of a person 1230 using the camera 1221 and transmit a digital representation of the image to an identity system device. The tablet computing device 1202 may also be operable to receive an age of the person 1230 from the identity system device and transmit an authorization signal to the vaporizer 1201 if the person 1230 is at least 18 years of age. The button 1211 of the vaporizer 1201 may be operable to activate the vaporizer 1201 only if the vaporizer 1201 has received an authorization signal.

Alternatively, the tablet computing device 1202 may transmit the age of the person 1230 to the vaporizer 1201. In such an example, the vaporizer 1201 may allow operation if the person 1230 is at least 18 years of age. Various configurations are possible and contemplated without departing from the scope of the present disclosure.

In various embodiments, the tablet computing device 1202 may reobtain the digital representation of the image upon the occurrence of a condition, such as refilling or recharging of the vaporizer 1201, expiration of a time period, receipt of a deauthorization signal from another electronic device, detection of a different image of a person's face, movement of the vaporizer 1201, alteration of the vaporizer 1201, expiration of a time period, interruption of a communication connection between the vaporizer 1201 and the tablet computing device 1202, travel of the vaporizer 1201 and the tablet computing device 1202 away from each other, and so on.

For example, after authorization, the vaporizer 1201 may remain authorized as long as the vaporizer 1201 is within 100 feet of the tablet computing device 1202. If the vaporizer 1201 is more than 100 feet away from the tablet computing device 1202, the vaporizer 1201 may deauthorize operation until the vaporizer 1201 receives a signal to reauthorize. Various configurations are possible and contemplated without departing from the scope of the present disclosure.

As described above, in various implementations, there may be multiple tiers of authorizations for a mobile identity information controlled device. In some examples, a person who has a higher tier of authorization may voluntarily restrict themselves to a lower tier in order to restrict his own use of the vaporizer 1201. By way of illustration, the person may restrict his use of the vaporizer 1201 to a certain amount of use per day (such as twenty times a day, five times a day, and so on), to a certain frequency of use (such as once per hour, at least two hours between uses, and so on), to use in certain places but not others (such as at work but not at home, at the gym, and so on), and so on. Various configurations are possible and contemplated without departing from the scope of the present disclosure.

Figure 13:
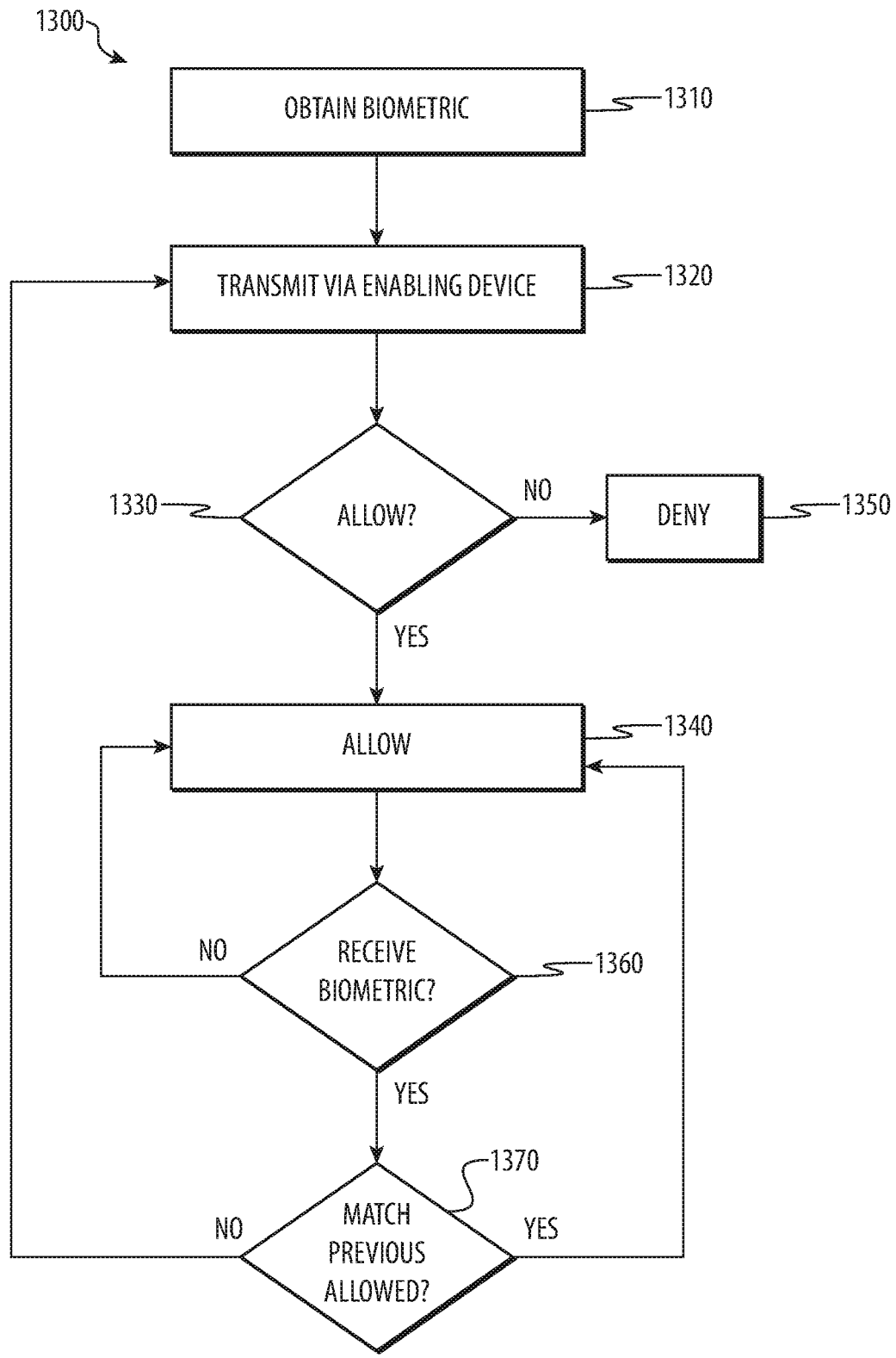
FIG. 13 depicts a flow chart illustrating a fifth example method for authorizing a mobile identity information controlled device. This method may be performed by one or more of the systems of FIG. 7-12.

FIG. 13 depicts a flow chart illustrating a fifth example method 1300 for authorizing a mobile identity information controlled device. This method 1300 may be performed by one or more of the systems 700-1200 of FIGS. 7-12.

At 1310, an electronic device may obtain a digital representation of a biometric. The electronic device may obtain the digital representation of the biometric by capturing the digital representation of the biometric via an integrated biometric reader device, receiving the digital representation of the biometric from another device that includes a biometric reader device, and so on.

At 1320, the electronic device may transmit the digital representation of the biometric via an enabling device. The electronic device may transmit the digital representation of the biometric to one or more identity system devices via the enabling device. In some examples, the enabling device may communicate with the electronic device and the identity system device using different communication media and/or different communication units.

At 1330, the electronic device may determine whether or not to allow operation using identity information obtained from the identity system device using the digital representation of the biometric. For example, the electronic device may receive the identity information and determine whether or not to allow operation. By way of another example, the electronic device may receive one or more signals indicating whether or not to allow operation. Such signals may be received from one or more devices that obtained the identity information and determined the appropriate signal to transmit using the identity information. If the electronic device determines to allow operation, the flow may proceed to 1340 where the electronic device may allow operation. Otherwise, the flow may proceed to 1350 where the electronic device may deny operation.

After the electronic device allows operation, the flow may proceed to 1360 where the electronic device may determine whether or not a digital representation of a biometric is received and/or otherwise obtained. If not, the flow may return to 1340 where the electronic device continues to allow operation. Otherwise, the flow may proceed to 1370 where the electronic device compares the new digital representation of the biometric to the previous digital representation of the biometric. If there is a match, the flow may return to 1340 where the electronic device continues to allow operation. Otherwise, the flow may return to 1320 where the electronic device may transmit the new digital representation of the biometric via the enabling device.

In various examples, this example method 1300 may be implemented as a group of interrelated software modules or components that perform various functions discussed herein. These software modules or components may be executed within a cloud network and/or by one or more computing devices, such as one or more of the devices illustrated in FIGS. 7-12.

Although the example method 1300 is illustrated and described as including particular operations performed in a particular order, it is understood that this is an example. In various implementations, various orders of the same, similar, and/or different operations may be performed without departing from the scope of the present disclosure.

For example, the method 1300 is illustrated and described as denying operation at 1350. However, in various examples, the flow may instead return to 1310 where the electronic device waits to obtain a different digital representation of a biometric. Various configurations are possible and contemplated without departing from the scope of the present disclosure.

Figure 14:
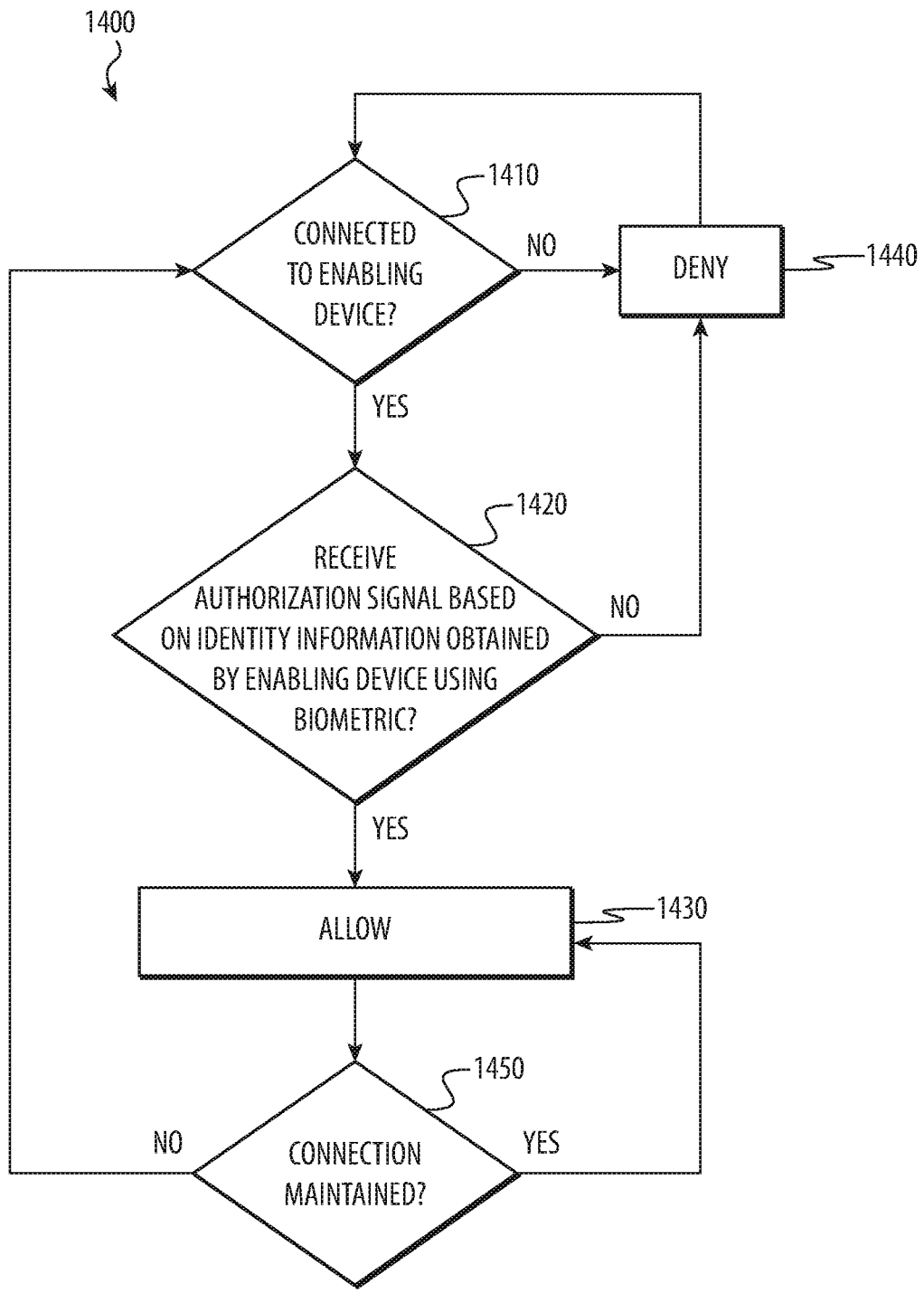
FIG. 14 depicts a flow chart illustrating a sixth example method for authorizing a mobile identity information controlled device. This method may be performed by one or more of the systems of FIGS. 7-12.

FIG. 14 depicts a flow chart illustrating a sixth example method 1400 for authorizing a mobile identity information controlled device. This method 1400 may be performed by one or more of the systems 700-1200 of FIGS. 7-12.

At 1410, an electronic device may determine whether or not the electronic device is connected to an enabling device via one or more communication media. If not, the electronic device may at 1440 deny operation. Otherwise, the flow may proceed to 1420.

At 1420, after the electronic device determines that the electronic device is connected to an enabling device via one or more communication media, the electronic device may determine whether or not an authorization signal is received that is based on identity information obtained by the enabling device using one or more digital representations of biometrics. If not, the flow may proceed to 1440 where the electronic device may deny operation. Otherwise, the flow may proceed to 1430 where the electronic device may allow operation.

After the electronic device allows operation, the flow may proceed to 1450 where the electronic device may determine whether or not the electronic device maintains the connection to the enabling device via the one or more communication media. If so, the flow may return to 1430 where the electronic device may continue to allow operation. Otherwise, the flow may return to 1410 where the electronic device may again determine whether or not the electronic device is connected to an enabling device via one or more communication media.

In various examples, this example method 1400 may be implemented as a group of interrelated software modules or components that perform various functions discussed herein. These software modules or components may be executed within a cloud network and/or by one or more computing devices, such as one or more of the devices illustrated in FIGS. 7-12.

Although the example method 1400 is illustrated and described as including particular operations performed in a particular order, it is understood that this is an example. In various implementations, various orders of the same, similar, and/or different operations may be performed without departing from the scope of the present disclosure.

For example, the method 1400 is illustrated and described as determining whether or not an authorization signal is received before allowing operation. However, in various implementations, the electronic device may receive the identity information itself and determine whether or not to authorize operation using the identity information. Various configurations are possible and contemplated without departing from the scope of the present disclosure.

In various implementations, a system for authorizing a mobile identity information controlled device may include a non-transitory storage medium that stores instructions, a biometric reader device, at least one communication unit, and a processor. The processor may execute the instructions to communicate with the mobile identity information controlled device using the at least one communication unit, receive at least one digital representation of a biometric using the biometric reader device, obtain identity information from an identity system device, via the at least one communication unit, using the at least one digital representation of the biometric, and determine whether to transmit an authorization signal to the mobile identity information controlled device using the at least one communication unit based on the identity information.

In some examples, the at least one digital representation of the biometric may include a digital representation of at least one of a fingerprint, a voiceprint, a facial image, a retina image, an iris image, a deoxyribonucleic acid sequence, a heart rhythm, or a gait. In a number of examples, the biometric reader device may include at least one of a fingerprint scanner, an optical fingerprint scanner, a phosphorescent fingerprint scanner, a camera, an image sensor, a saliva sensor, a deoxyribonucleic acid sensor, a heart rhythm monitor, or a microphone.

In various examples, the at least one communication unit may include a short-range communication unit and a long-range communication unit, the processor may communicate with the mobile identity information controlled device using the short-range communication unit, and the processor may obtain the identity information from the identity system device using the long-range communication unit. In some such examples, the short-range communication unit may include at least one of a near-field communication unit, a Bluetooth communication unit, or a Bluetooth Low Energy communication unit and the long-range communication unit may include a WiFi communication unit or a cellular communication unit.

In a number of examples, the mobile identity information controlled device may be configured to deauthorize after receiving the authorization signal if the communication between the mobile identity information controlled device and the at least one communication unit is interrupted. In various examples, the processor may determine to transmit the authorization signal to the mobile identity information controlled device based on a verified age included in the identity information. In a number of examples, the mobile identity information controlled device may be a vehicle, a vaporizer, or a media player.

In some implementations, a mobile identity information controlled device may include a non-transitory storage medium that stores instructions, a biometric reader device, a communication unit operative to communicate with an enabling device, and a controller. The controller may execute the instructions to receive at least one digital representation of a biometric using the biometric reader device, transmit the at least one digital representation of the biometric to the enabling device using the communication unit, and determine whether to authorize operation of the mobile identity information controlled device based on identity information obtained by the enabling device from an identity system device using the at least one digital representation of the biometric.

In various examples, the at least one digital representation of the biometric may include a first biometric and the controller may be operative to receive a second biometric via the biometric reader device and deauthorize operation of the mobile identity information controlled device when the second biometric mismatches the first biometric. In some such examples, the controller may attempt to reauthorize operation of the mobile identity information controlled device by transmitting the second biometric to the enabling device using the communication unit.

In some examples, the controller may deauthorize operation of the mobile identity information controlled device upon determining that communication with the enabling device is interrupted. In a number of examples, the mobile identity information controlled device may be a vehicle, a vaporizer, or a media player. In various examples, the biometric reader device may include at least one of a fingerprint scanner, an optical fingerprint scanner, a phosphorescent fingerprint scanner, a camera, an image sensor, a saliva sensor, a deoxyribonucleic acid sensor, a heart rhythm monitor, or a microphone. In a number of examples, the at least one digital representation of the biometric may include a digital representation of at least one of a fingerprint, a voiceprint, a facial image, a retina image, an iris image, a deoxyribonucleic acid sequence, a heart rhythm, or a gait. In some examples, the communication unit may include at least one of a near-field communication unit, a Bluetooth communication unit, or a Bluetooth Low Energy communication unit.

In various embodiments, a mobile identity information controlled device may include a non-transitory storage medium that stores instructions, a biometric reader device, a communication unit, and a controller. The controller may execute the instructions to receive at least one digital representation of a biometric using the biometric reader device; obtain identity information from an identity system device, via the communication unit, using the at least one digital representation of the biometric; and determine whether to authorize operation of the mobile identity information controlled device based on a verified age included in the identity information.

In some examples, the mobile identity information controlled device may be a vehicle, a vaporizer, or a media player. In a number of examples, the at least one digital representation of the biometric may include a digital representation of at least one of a fingerprint, a voiceprint, a facial image, a retina image, an iris image, a deoxyribonucleic acid sequence, a heart rhythm, or a gait. In various examples, the biometric reader device may include at least one of a fingerprint scanner, an optical fingerprint scanner, a phosphorescent fingerprint scanner, a camera, an image sensor, a saliva sensor, a deoxyribonucleic acid sensor, a heart rhythm monitor, or a microphone.

Although the above is illustrated and described in the context of a mobile identity information controlled device, it is understood that these are examples. In various implementations, techniques disclosed herein may be used in the context of electronic devices that are not mobile and/or not easily mobile without departing from the scope of the present disclosure.

For example, in some implementations, the techniques described herein may be used in the context of a smart house and/or other smart building. Authorizations may be granted to access (whether temporarily, conditionally, and so on) part or all of the house and/or use various components included therein. For example, a cleaning service may granted authorization to enter areas of the smart house that the cleaning service is to clean. By way of another example, a portion of the smart house may be leased for a night to a person and the person may be authorized to enter that portion of the house and/or to use various components of the smart house (such as entry to one bedroom but not another, ability to operate a television but not a stove, and so on). Various configurations are possible and contemplated without departing from the scope of the present disclosure.

Although the above illustrates and describes a number of embodiments, it is understood that these are examples. In various implementations, various techniques of individual embodiments may be combined without departing from the scope of the present disclosure.

As described above and illustrated in the accompanying figures, the present disclosure relates to a system for authorizing a mobile identity information controlled device. At least one digital representation of a biometric may be received using a biometric reader device. Identity information may be obtained from an identity system device using the digital representation of the biometric. Operation of a mobile identity information controlled device may be controlled using the identity information. In this way, operation of a mobile identity information controlled device may be controlled using identity information while protecting access to the identity information. This may enable performance of functions not previously performable by the system, reduce the number of system components, prevent duplication of components, prevent identity information and/or biometric data from being stored by the mobile identity information controlled device, minimize communication connection traffic, improve the efficiency and/or operation of the system, and so on.

The present disclosure recognizes that biometric and/or other personal data is owned by the person from whom such biometric and/or other personal data is derived. This data can be used to the benefit of those people. For example, biometric data may be used to conveniently and reliably identify and/or authenticate the identity of people, access securely stored financial and/or other information associated with the biometric data, and so on. This may allow people to avoid repeatedly providing physical identification and/or other information.

The present disclosure further recognizes that the entities who collect, analyze, store, and/or otherwise use such biometric and/or other personal data should comply with well-established privacy policies and/or privacy practices. Particularly, such entities should implement and consistently use privacy policies and practices that are generally recognized as meeting or exceeding industry or governmental requirements for maintaining security and privately maintaining biometric and/or other personal data, including the use of encryption and security methods that meets or exceeds industry or government standards. For example, biometric and/or other personal data should be collected for legitimate and reasonable uses and not shared or sold outside of those legitimate uses. Further, such collection should occur only after receiving the informed consent. Additionally, such entities should take any needed steps for safeguarding and securing access to such biometric and/or other personal data and ensuring that others with access to the biometric and/or other personal data adhere to the same privacy policies and practices. Further, such entities should certify their adherence to widely accepted privacy policies and practices by subjecting themselves to appropriate third party evaluation.

Additionally, the present disclosure recognizes that people may block the use of, storage of, and/or access to biometric and/or other personal data. Entities who typically collect, analyze, store, and/or otherwise use such biometric and/or other personal data should implement and consistently prevent any collection, analysis, storage, and/or other use of any biometric and/or other personal data blocked by the person from whom such biometric and/or other personal data is derived.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A system for authorizing a mobile electronic device, comprising:
   an identity system device;
   the mobile electronic device; and
   an enabling device configured to intermediate between the mobile electronic device and the identity system device, the enabling device comprising:
      a non-transitory storage medium that stores instructions;
      a biometric reader device;
      at least one communication unit; and
      a processor that executes the instructions to:
         receive at least one digital representation of a biometric using the biometric reader device;
         transmit the at least one digital representation of the biometric to the identity system device using the at least one communication unit;
         obtain identity information from the identity system device, via the at least one communication unit;
         determine whether to transmit an authorization signal to the mobile electronic device using the at least one communication unit based on the identity information;
         receive a deauthorization signal from the mobile electronic device; and
         reobtain the identity information from the identity system device, wherein:
   the identity information includes information other than a confirmation that the at least one digital representation of the biometric matches stored biometric information.

2. The system of claim 1, wherein the at least one digital representation of the biometric comprises a digital representation of at least one of a fingerprint, a voiceprint, a facial image, a retina image, an iris image, a deoxyribonucleic acid sequence, a heart rhythm, or a gait.

3. The system of claim 1, wherein the biometric reader device comprises at least one of a fingerprint scanner, an optical fingerprint scanner, a phosphorescent fingerprint scanner, a camera, an image sensor, a saliva sensor, a deoxyribonucleic acid sensor, a heart rhythm monitor, or a microphone.

4. The system of claim 1, wherein:
the at least one communication unit comprises a short-range communication unit and a long-range communication unit;
the processor communicates with the mobile identity information controlled device using the short-range communication unit; and
the processor obtains the identity information from the identity system device using the long-range communication unit.

5. The system of claim 4, wherein:
the short-range communication unit comprises at least one of a near-field communication unit, a Bluetooth communication unit, or a Bluetooth Low Energy communication unit; and
the long-range communication unit comprises a WiFi communication unit or a cellular communication unit.

6. The system of claim 1, wherein the mobile electronic device is configured to deauthorize after receiving the authorization signal if the communication between the mobile electronic device and the at least one communication unit is interrupted.

7. The system of claim 1, wherein the processor determines to transmit the authorization signal to the mobile electronic device based on a verified age included in the identity information.

8. The system of claim 1, wherein the mobile electronic device comprises a vehicle, a vaporizer, or a media player.

9. A mobile electronic device, comprising:
a non-transitory storage medium that stores instructions;
a biometric reader device;
a communication unit operative to communicate with an enabling device configured to intermediate between the mobile electronic device and an identity system device; and
a controller that executes the instructions to:
receive at least one digital representation of a biometric using the biometric reader device;
transmit the at least one digital representation of the biometric to the enabling device using the communication unit; and
determine whether to authorize operation of the mobile electronic device based on identity information obtained by the enabling device from the identity system device in response to the enabling device transmitting the at least one digital representation of the biometric to the identity system device;
in response to determining that the operation cannot be authorized, transmit a deauthorization signal and a request to reobtain the identity information to the enabling device, wherein:
the identity information includes information other than a confirmation that the at least one digital representation of the biometric matches stored biometric information.

10. The mobile electronic device of claim 9, wherein:
the at least one digital representation of the biometric comprises a first biometric; and
the controller is operative to:
receive a second biometric via the biometric reader device; and
deauthorize operation of the mobile electronic device when the second biometric mismatches the first biometric.

11. The mobile electronic device of claim 10, wherein the controller attempts to reauthorize operation of the mobile electronic device by transmitting the second biometric to the enabling device using the communication unit.

12. The mobile electronic device of claim 9, wherein the controller deauthorizes operation of the mobile electronic device upon determining that communication with the enabling device is interrupted.

13. The mobile electronic device of claim 9, wherein the mobile electronic device comprises a vehicle, a vaporizer, or a media player.

14. The mobile electronic device of claim 9, wherein the biometric reader device comprises at least one of a fingerprint scanner, an optical fingerprint scanner, a phosphorescent fingerprint scanner, a camera, an image sensor, a saliva sensor, a deoxyribonucleic acid sensor, a heart rhythm monitor, or a microphone.

15. The mobile electronic device of claim 9, wherein the at least one digital representation of the biometric comprises a digital representation of at least one of a fingerprint, a voiceprint, a facial image, a retina image, an iris image, a deoxyribonucleic acid sequence, a heart rhythm, or a gait.

16. The mobile electronic device of claim 9, wherein the communication unit comprises at least one of a near-field communication unit, a Bluetooth communication unit, or a Bluetooth Low Energy communication unit.

17. A mobile electronic device, comprising:
a non-transitory storage medium that stores instructions;
a biometric reader device;
a communication unit; and
a controller that executes the instructions to:
receive at least one digital representation of a biometric using the biometric reader device;
obtain identity information from an identity system device, via the communication unit, in response to transmitting the at least one digital representation of the biometric to the identity system device;
determine whether to authorize operation of the mobile electronic device based on a verified age included in the identity information; and
determine a tier of authorization from a plurality of tiers related to using of functions and components of the mobile electronic device and granting authorization to use the mobile electronic device to other users; and
in response to determining that the operation cannot be authorized, transmit a deauthorization signal and a request to reobtain the identity information from the identity system device.

18. The mobile electronic device of claim 17, wherein the mobile electronic device comprises a vehicle, a vaporizer, or a media player.

19. The mobile electronic device of claim 17, wherein the at least one digital representation of the biometric comprises a digital representation of at least one of a fingerprint, a voiceprint, a facial image, a retina image, an iris image, a deoxyribonucleic acid sequence, a heart rhythm, or a gait.

20. The mobile electronic device of claim 17, wherein the biometric reader device comprises at least one of a fingerprint scanner, an optical fingerprint scanner, a phosphorescent fingerprint scanner, a camera, an image sensor, a saliva sensor, a deoxyribonucleic acid sensor, a heart rhythm monitor, or a microphone.

* * * * *